(12) United States Patent
Mak et al.

(10) Patent No.: US 11,144,287 B2
(45) Date of Patent: Oct. 12, 2021

(54) COMPILE TIME VALIDATION OF PROGRAMMING CODE

(71) Applicant: International Business Machines Corporation, Armonk, NY (US)

(72) Inventors: Howard Mak, Peakhurst (AU); Mark Thomas Hamlet Taylor, Hornsby (AU); Graham Bucknell, Frenchs Forest (AU); Clarissa Wisan, Maroubra (AU)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/518,176

(22) Filed: Jul. 22, 2019

(65) Prior Publication Data

US 2021/0026608 A1   Jan. 28, 2021

(51) Int. Cl.
*G06F 9/44* (2018.01)
*G06F 8/41* (2018.01)

(52) U.S. Cl.
CPC .............. *G06F 8/433* (2013.01); *G06F 8/437* (2013.01)

(58) Field of Classification Search
None
See application file for complete search history.

(56) References Cited

U.S. PATENT DOCUMENTS

| 6,163,778 | A  | * | 12/2000 | Fogg ................... G06F 16/9558 |
| | | | | 707/E17.114 |
| 8,201,083 | B2 | * | 6/2012  | Kostoulas ............... G06F 40/14 |
| | | | | 715/237 |
| 8,255,372 | B2 |   | 8/2012  | Medi |
| 8,813,027 | B2 |   | 8/2014  | Ng |
| 9,244,706 | B2 |   | 1/2016  | Calev |
| 10,552,530 | B1 | * | 2/2020  | Karpel ................... G06F 40/186 |
| 2002/0174125 | A1 | * | 11/2002 | Lucovsky ............ G06F 21/6245 |
| | | | | 707/999.1 |
| 2006/0074730 | A1 | * | 4/2006  | Shukla ............... G06Q 10/0633 |
| | | | | 705/7.27 |
| 2009/0293047 | A1 | * | 11/2009 | Chen ....................... G06F 8/433 |
| | | | | 717/151 |
| 2010/0023700 | A1 | * | 1/2010  | Chen ..................... G06F 8/4442 |
| | | | | 717/160 |
| 2012/0131547 | A1 | * | 5/2012  | Muir ......................... G06F 8/33 |
| | | | | 717/109 |
| 2015/0149745 | A1 | * | 5/2015  | Eble ........................ G06F 8/445 |
| | | | | 712/216 |

OTHER PUBLICATIONS

"Jackson JSON—Using @JsonTypeInfo annotation to handle polymorphic types", retrieved from the Internet May 23, 2019, 4 pages, <https://www.logicbig.com/tutorials/misc/jackson/jackson-json-type-info-annotation.html>.

(Continued)

*Primary Examiner* — Qamrun Nahar
(74) *Attorney, Agent, or Firm* — David K. Mattheis; Maeve M. Carpenter

(57) ABSTRACT

Validating programming code by providing a data schema including registered data types, identifying a data object as defined according to a registered data type of the schema; and checking attempts to access the data object according to the registered data types of the data schema, at compile time.

20 Claims, 3 Drawing Sheets

(56) References Cited

OTHER PUBLICATIONS

"json2typescript—npm", retrieved from the Internet on May 23, 2019, 13 pages, <https://www.npmjs.com/package/json2typescript>.
"Typed JSON parsing and serializing for TypeScript that preserves type information", GitHub—JohnWeisz/TypedJSON, retrieved from the Internet on May 23, 2019, 6 pages, <https://github.com/JohnWeisz/TypedJSON>.
"TypeScript JSON type validation", GitHub—mojotech/json-type-validation, retrieved from the Internet on May 23, 2019, 4 pages, <https://github.com/mojotech/json-type-validation>.

* cited by examiner

COMPILE TIME VALIDATION OF PROGRAMMING CODE

BACKGROUND

The disclosure relates generally to validating programming code at compile time. The disclosure relates particularly to compile time validation of programming code accessing defined data types.

Computer program code creates, updates, and processes data that must conform to formal specification. The specification may include a hierarchical structure of the data item, the fields it must contain and the allowable values for the fields. Programming languages may define broad data types (e.g., JSON or XML), with defined types such as string, number, Boolean, etc. Runtime checks are made to ensure that data items conform to their data type specification.

SUMMARY

Aspects of the invention disclose methods, systems and computer readable media associated with validating programming code by registering the association of a data type with a schema, identifying a data object as defined according to a data type of the schema; and checking attempts to access the data object according to the data type of the data object, at compile time.

DETAILED DESCRIPTION

Figure 1:
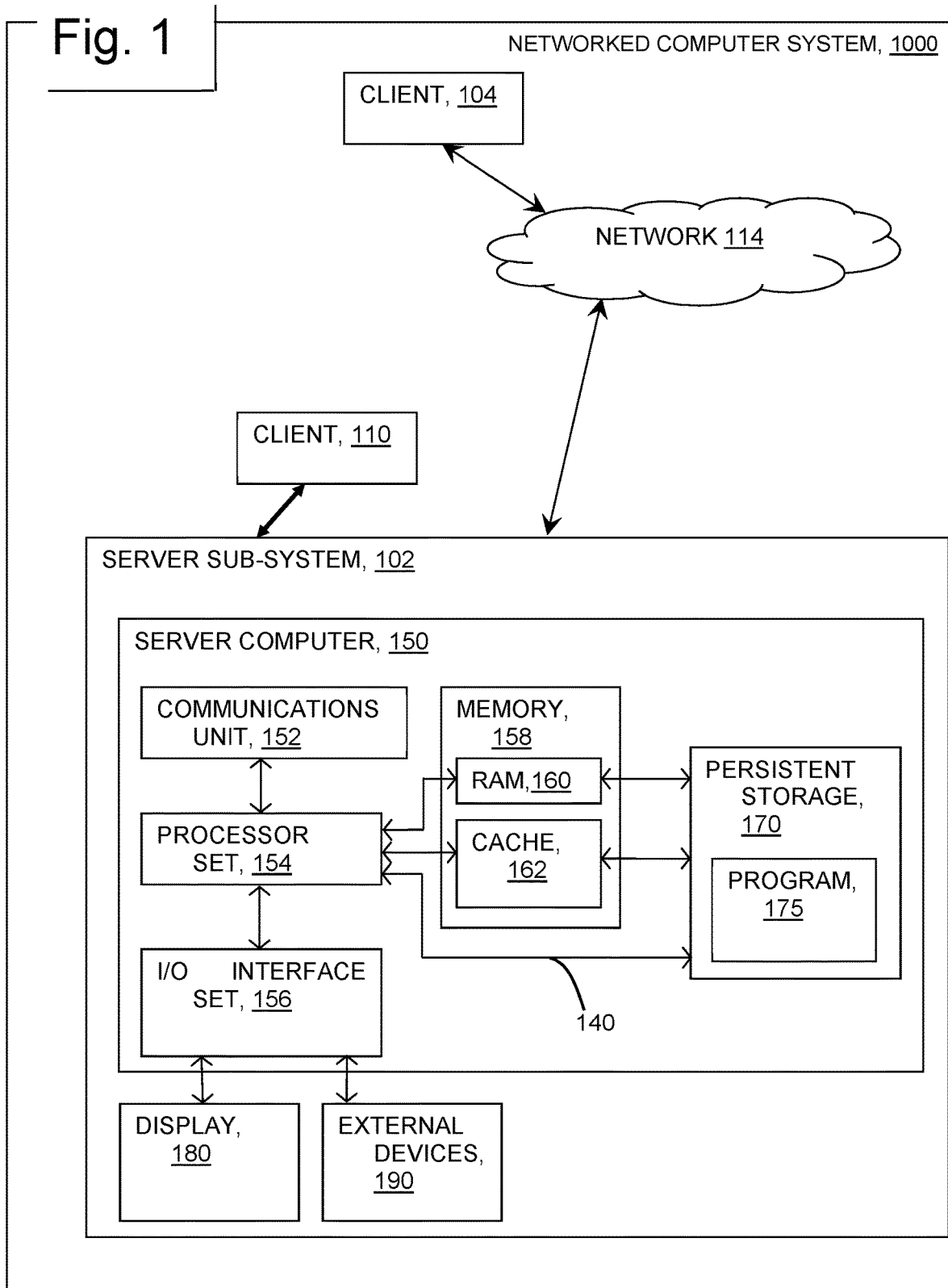
FIG. 1 provides a schematic illustration of a system, according to an embodiment of the invention.

Runtime validation of data does not provide support for a developer creating or modifying code. Runtime parsing of the code does not ensure that programming code which subsequently accesses the data correctly references the fields of the data item. For example, application code could have errors such as: using a misspelled field name, attempting to write a string in a number field, or accessing a child node in the data that is not valid for the data type. Programming languages do not have built in support for specific data definitions so there are no auto-complete or compile time checks to ensure that all the data item accesses are correct. Current systems of runtime validation compare data to a schema whereas embodiments of the present invention use a schema at compile time to validate the code that accesses the data.

New code can include microservices which consume generate or validate data (such as JSON data). There are no tools that help developers writing the code to access that data. The developer would need to write code based upon visual inspection of the defined data types, or sample data files. The developer is limited to a code—test—modify cycle, which can be tedious in practice. The developer can test the new code by creating a sample data document which conforms to the schema, then run their code against the data sample. If the code fails, the developer knows they have an error, but may not know the details of that error. Plus, the sample data is limited in scope and even if the code successfully proc3sses the sample, that is not an indication that it will successfully process all other data sets which conform to the schema. What is desired is a compile time method to validate programming code data access attempts.

In an embodiment, the disclosed inventions work in conjunction with a code compiler to reconcile access to data types in the code at compile time. In this embodiment, schemas defining data types are created and provided to the computer system. The registered data types of the schema define the fields of the data types in addition to constraints on each field of the data type. The registered data types of the schema can include a broad definition of a data type, JSON, or XML, together with more specific defining characteristics including field names and field constraints. As an example, a schema defines a data type that includes "address item" and associates constraints on the valid values of "address item". In this embodiment, a user creating code annotates data items, associating those items with defined data types of the schema. The method then reconciles attempts to access the annotated items with the defined data types and provides feedback on the attempts. In an embodiment, error messages are generated for incorrect attempts to access data, e.g., attempts to access fields that do not exist for a defined data type or attempts to set fields to values inconsistent with the defined data type. In an embodiment, when no incorrect attempts are detected, a message is sent to the user indicating that the submitted code is clear of any data access attempt errors.

In an embodiment, the methods of the inventions are applied to an integrated development environment (IDE). In this embodiment, data items are again associated with the schema data types by appropriate annotations in the created code. The IDE accesses the schema allowing auto-completion of field names as code is created. As an example, a defined data type "User" includes the fields 'User' and 'Address'. As a user is typing the code annotation and begins to enter the field name 'address', typing 'a', the IDE auto-completes the field name 'address' saving time and ensuring that there will be no error generated due to a misspelled or otherwise non-existent field name for the data type.

The following pseudo code illustrates an embodiment of the invention. In the pseudo code, an annotation "datatype" is applied in the code. In the example a data type "User" contains fields including "address" and the data type "address" contains fields including "town". On line 2 the data item "myUser" is defined as conforming to the data type "User". The embodiment will then reconcile subsequent references to "myUser" are valid for the data type "User". The access on line 3 will be checked against the access on line 7. Similarly, the definition of data item "myAddress" as conforming to the data type "address" on line 3, will be reconciled with access to the data item on line 9.

```
1   getUserTownName(usertext: string): string {
2       let myUser: JSON(@datatype(User)) = JSON.parse(usertext);
3       let myAddress: JSON(@datatype(Address)) = getAddress(myUser);
4       return myAddress["town"];
5   }
```

```
 6
 7  getAddress(user: JSON(@datatype(User))): JSON(@datatype(Address)) {
 8          let address = user["address"];
 9          return address;
10      }
11
12          getPostalAddress(user: JSON(@datatype(User))): JSON(@datatype(Address)) {
13          let postaladdress = user["postaladdress"];
14          return postaladdress;
```

If the schema that defines the registered type User defines only address and not postaladdress then line 11 in the method getPostalAddress would be flagged as a compilation error.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise program code validation program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the code validation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., code validation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
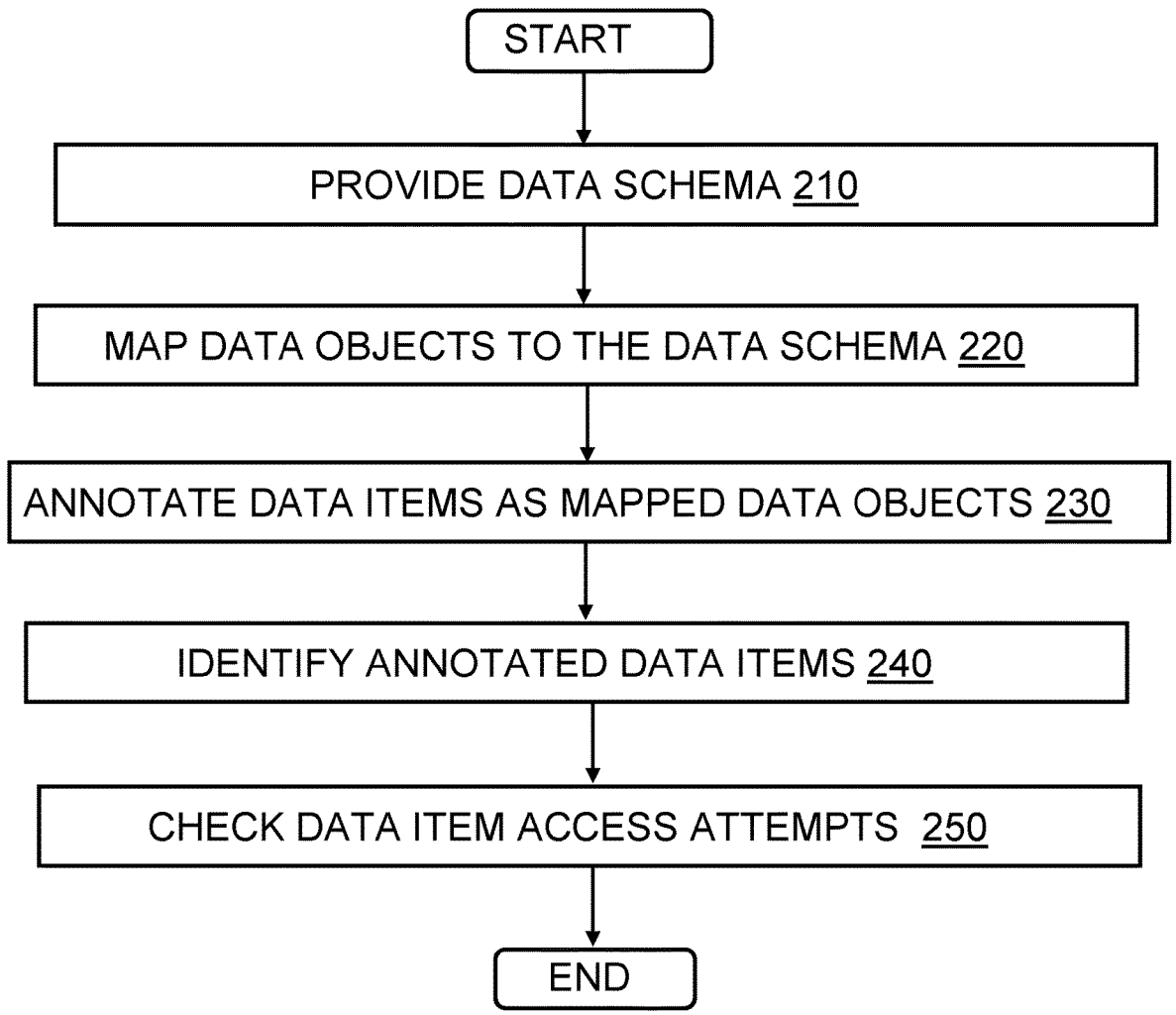
FIG. 2 provides a flowchart depicting an operational sequence, according to an embodiment of the invention.

FIG. 2 provides a flowchart 200, illustrating exemplary activities associated with the practice of the disclosure. After program start, at 210 code validation program 175 provides a data schema to the system processor 154. The data schema can be stored in persistent storage 170. The data schema can be any standard programming language schema format. At 220, data types are mapped to the provided data schema. The mapping can be achieved by a configuration file which associates data type names with elements of the data schema. At 230, data items in program code are annotated to associate the data items with mapped data types. The method accesses programming code from memory 158. The embodiment scans the programming code to identify data items annotated to define them as data types of the provided schema at 240. After identifying data items defined according to data types of the schema, the method checks subsequent references to the identified data items with the data type definition of the data schema at 250. Messages are sent to a user to reflect the results of the checking the code, either error messages indicating invalid attempt to access data items, or success messages indicating that no invalid data access attempts were found in the processed code.

Figure 3:
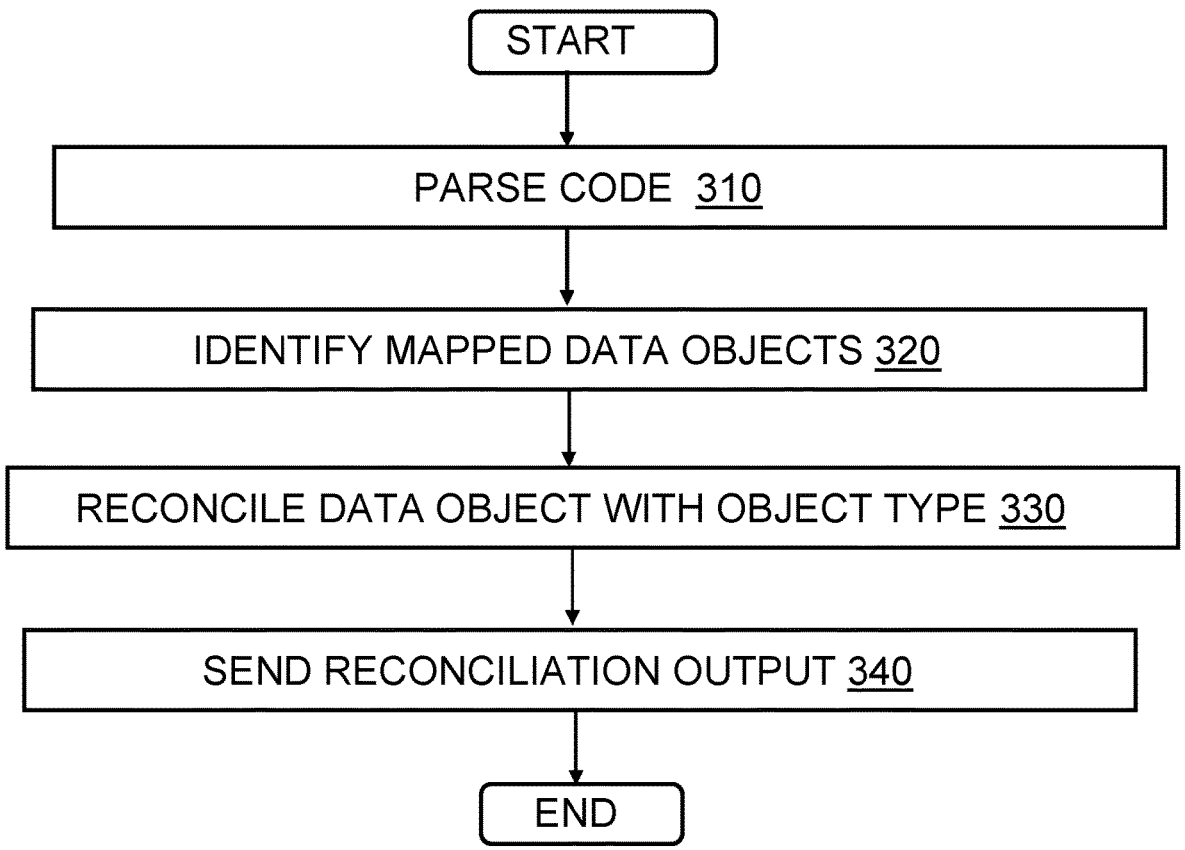
FIG. 3 provides a flowchart depicting an operational sequence, according to an embodiment of the invention.

As shown in FIG. 3, in flowchart 300, after start, code validation program parses the code at 310 as part of the compiling or IDE process. As the code is parsed, the method checks for annotations of data objects linking them to a defined schema at 320. Annotated objects are then reconciled with the data types of the schema at 330. To reconcile the annotated data objects, the program checks that the code foes not attempt to access fields which do not exist in the data type or attempt to set fields to values inconsistent with the data type. The results of the reconciliation, whether errors have been found or all parsed code has passed error free, is displayed as a message to the user of the compiler or IDE at 340.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for validating programming code at compile time, the method comprising:
    providing a schema, by one or more computer processors, wherein the schema comprises registered data types with associated constraints;
    identifying, by the one or more computer processors, a data object as defined according to a data type of the schema; and
    validating, by the one or more computer processors, at compile time, code that attempts to access the data object according to the associated constraints of the data type of the data object.

2. The computer implemented method according to claim 1, wherein identifying the data object comprises identifying a code annotation associating the data object and the registered data type.

3. The computer implemented method according to claim 1, further comprising generating, by the one or more computer processors, a message indicating that no data object access attempt errors were identified.

4. The computer implemented method according to claim 1, further comprising generating, by the one or more computer processors, an error message for incorrect attempts to access the data object according to the data type of the data object.

5. The computer implemented method according to claim 1, further comprising auto-completing, by the one or more computer processors, data fields associated with registered data types during code development.

6. The computer implemented method according to claim 1, wherein checking attempts to access the data object comprises identifying programming code setting a field to a value which is not consistent with the data type.

7. The computer implemented method according to claim 1, wherein checking attempts to access the data object comprises identifying code attempting to access fields that do not exist in the data type.

8. A computer program product for validating programming code at compile time, the computer program product comprising one or more computer readable storage devices and stored program instructions on the one or more computer readable storage devices, the stored program instructions comprising:
    programmed instructions for providing a schema, wherein the schema comprises registered data types with associated constraints;
    program instructions for identifying a data object as defined according to a data type of the schema; and
    program instructions for validating at compile time, code that attempts to access the data object according to the associated constraints of the data type of the data object.

9. The computer program product according to claim 8, wherein identifying the data object comprises identifying a code annotation associating the data object and the registered data type.

10. The computer program product according to claim 8, the stored program instructions further comprising program instructions for generating a message indicating that no data object access attempt errors were identified.

11. The computer program product according to claim 8, the stored program instructions further comprising program instructions for generating an error message for incorrect attempts to access the data object according to the data type of the data object.

12. The computer program product according to claim 8, the stored program instructions further comprising program instructions for auto-completing data fields associated with registered data types during code development.

13. The computer program product according to claim 8, wherein checking attempts to access the data object comprises identifying code setting a field to a value which is not consistent with the data type.

14. The computer program product according to claim 8, wherein checking attempts to access the data object comprises identifying code attempting to access fields that do not exist in the data type.

15. A computer system for validating programming code at compile time, the computer system comprising:
- one or more computer processors;
- one or more computer readable storage devices; and
- stored program instructions on the one or more computer readable storage devices for execution by the one or more computer processors, the stored program instructions comprising:
  - programmed instructions for providing a schema, wherein the schema comprises registered data types with associated constraints;
  - program instructions for identifying a data object as defined according to a data type of the schema; and
  - program instructions for validating at compile time, code that attempts to access the data object according to the associated constraints of the data type of the data object.

16. The computer system according to claim 15, wherein identifying the data object comprises identifying a code annotation associated with the data object and the registered data type.

17. The computer system according to claim 15, the stored program instructions further comprising program instructions for generating an error message for incorrect attempts to access the data object according to the data type of the data object.

18. The computer system according to claim 15, the stored program instructions further comprising program instructions for auto-completing data fields associated with registered data types during code development.

19. The computer system according to claim 15, wherein checking attempts to access the data object comprises identifying code setting a field to a value which is not consistent with the data type.

20. The computer system according to claim 15, wherein checking attempts to access the data object comprises identifying code attempting to access fields that do not exist in the data type.

* * * * *